United States Patent
Rahardja et al.

(10) Patent No.: US 6,564,777 B2
(45) Date of Patent: May 20, 2003

(54) DIRECTLY ACTUATED INJECTION VALVE WITH A COMPOSITE NEEDLE

(75) Inventors: Irawan Rahardja, Vancouver (CA); Mike Hebbes, Vancouver (CA)

(73) Assignee: Westport Research Inc., Vancouver (CA)

( * ) Notice: Subject to any disclaimer, the term of this patent is extended or adjusted under 35 U.S.C. 154(b) by 88 days.

(21) Appl. No.: 09/863,189

(22) Filed: May 23, 2001

(65) Prior Publication Data

US 2001/0035164 A1 Nov. 1, 2001

Related U.S. Application Data

(63) Continuation-in-part of application No. 09/522,130, filed on Mar. 9, 2000, now Pat. No. 6,298,829.
(60) Provisional application No. 60/159,791, filed on Oct. 15, 1999.

(51) Int. Cl.⁷ ........................ F02M 55/02; F02M 51/00
(52) U.S. Cl. ...................................... 123/467; 123/478
(58) Field of Search ................................ 123/467, 472, 123/478, 498; 239/102.2, 533.2, 533.9; 251/129.06

(56) References Cited

U.S. PATENT DOCUMENTS

| | | | |
|---|---|---|---|
| 3,598,506 A | * 8/1971 | O'Neill | 417/383 |
| 4,158,368 A | 6/1979 | Clark | 137/487.5 |
| 4,725,002 A | 2/1988 | Trachte | 239/102.2 |
| 4,813,601 A | 3/1989 | Schwerdt et al. | 239/91 |
| 5,031,841 A | 7/1991 | Schafer | 239/585 |
| 5,035,360 A | 7/1991 | Green et al. | 239/585 |
| 5,697,554 A | 12/1997 | Auwaerter et al. | 239/88 |
| 5,779,149 A | 7/1998 | Hayes, Jr. | 239/124 |
| 5,819,710 A | 10/1998 | Huber | 123/498 |
| 5,845,852 A | 12/1998 | Waldman et al. | 239/533.8 |
| 5,875,764 A | 3/1999 | Kappel et al. | 123/467 |
| 6,062,533 A | 5/2000 | Kappel et al. | 251/57 |

FOREIGN PATENT DOCUMENTS

| | | |
|---|---|---|
| DE | 197 27 992 | 1/1999 |
| EP | 0 869 278 | 8/1998 |
| GB | 2 321 501 | 7/1998 |
| JP | 09-324723 | 12/1997 |
| JP | 10-009084 | 1/1998 |
| WO | WO 85/02445 | 6/1985 |

* cited by examiner

*Primary Examiner*—Mahmoud Gimie
(74) *Attorney, Agent, or Firm*—McAndrews, Held & Malloy, Ltd.

(57) ABSTRACT

A directly actuated injection valve comprises a hollow valve housing, a valve needle disposed within the hollow interior, a needle spring, and a magnetostrictive actuator assembly disposed in an annular space around a portion of the valve needle. A magnetic field actuates the magnetostrictive material to change its length to cause a corresponding movement of the valve needle that actuates the valve. The valve needle is comprises of a plurality of magnetostrictive actuator assembly is formed from a non-ferromagnetic material and the portion of the needle comprising the needle tip, which contacts the valve seat, is formed from a different material that has higher through-hardness than that the non-ferromagnetic material. The portion of the needle formed from a non-ferromagnetic material prevents interference with the flux field that is directed through the magnetostrictive member.

28 Claims, 3 Drawing Sheets

DIRECTLY ACTUATED INJECTION VALVE WITH A COMPOSITE NEEDLE

CROSS-REFERENCE TO RELATED APPLICATION(S)

This application is a continuation-in-part of U.S. patent application Ser. No. 09/522,130 filed Mar. 9, 2000, entitled "Directly Actuated Injection Valve", now U.S. Pat. No. 6,298,829 issued Oct. 9, 2001. The '130 application relates to and claims priority benefits from U.S. Provisional Patent Application Ser. No. 60/159,791 filed Oct. 15, 1999, entitled "Directly Actuated Injector". The '130 application and the '791 application are each incorporated herein by reference in their entirety.

FIELD OF THE INVENTION

The present invention relates generally to high-pressure fuel injection valves or injectors for internal combustion engines, and, more specifically, to an injection valve that is directly controllable by a position actuating magnetostrictive material and that includes a passive hydraulic link.

BACKGROUND OF THE INVENTION

Direct injection of a gaseous fuel into the combustion chamber of an internal combustion engine is desirable for several reasons. For example, direct injection allows charge stratification, eliminating throttling losses associated with homogeneous charge engines. Additionally, with direct injection late in the compression stroke, a high-compression ratio can be maintained, maintaining the efficiency of conventional diesel engines. Further, when the fuel that is directly injected comprises natural gas, propane, or hydrogen, the emissions of $NO_x$ and particulate matter (PM) are significantly reduced. The directly injected gaseous fuel can be ignited with a glow plug, with a spark plug, with pilot diesel fuel, or with any other energy source. The gaseous fuel should be injected at high pressure to overcome the combustion chamber pressure, which is high at the end of the compression stroke. Preferably, the injection pressure is high enough to promote good mixing between the injected fuel and the combustion chamber air.

Direct injection at high pressures presents several challenges. The use of high-pressure fuels for direct injection results in high fuel pressures existing within the injection valve or injector. As a result, when closed, the injection valve should typically be strongly seated to avoid leakage of the fuel into the combustion chamber between injection events. When the valve is a needle valve, the valve is seated when the sealing surfaces of the movable valve needle and the valve seat are in fluid-tight contact with each other. The valve seat is generally part of the valve housing or body.

Moreover, compared to low-pressure systems, higher forces are needed to open the injection valve since the valve should be strongly seated to remain sealed when the valve tip is exposed to the high pressures generated in the combustion chamber. High closing forces are also involved since the needle of a fuel injection valve for a high-pressure system should overcome the high forces generated by the exiting pressurized fuel when the needle is in the open position.

Additionally, there is only a small window of time during which the fuel can be injected. For example, at 4500 revolutions per minute (RPM), at full load, all of the fuel is preferably injected in less than 2–3 milliseconds.

Co-owned U.S. Pat. No. 6,298,829 discloses an injection valve that can achieve the performance to inject a gaseous fuel through injection events having a duration of less than 2–3 milliseconds. A preferred embodiment of the injection valve disclosed in the '130 application comprises a tubular magnetostrictive actuator assembly with a valve needle that extends axially through the center of the actuator assembly. The actuator assembly comprises a tubular magnetostrictive member that expands in length when it is actuated by subjecting it to a magnetic field. The magnetic field is generated, for example by directing an electric current through an electric coil disposed in an annular space around the tubular magnetostrictive member.

An advantage of this arrangement is that a more compact length is achieved since the tubular actuator assembly overlaps with the valve needle. However, a concern with respect to this arrangement is that the valve needle extending through the actuator assembly may cause interference with the magnetic field and some of the magnetic flux may be drained from the magnetostrictive member and conducted through the valve needle. Accordingly, for injection valves employing such an arrangement, there is a need to ensure that the valve needle does not interfere with the operation of the actuator assembly.

SUMMARY OF THE INVENTION

An injection valve injects fuel into a combustion chamber of an internal combustion engine. The injection valve comprises:

(a) a valve housing comprising:
   a fuel inlet port;
   an interior chamber fluidly connected to the fuel inlet port;
   a nozzle comprising a valve seat and at least one nozzle orifice providing a fluid passage from the interior chamber to the combustion chamber;

(b) an actuator assembly disposed within the valve housing, the actuator assembly comprising a magnetostrictive member actuatable by imposition of a magnetic field to expand in length to provide a valve opening force;

(c) a plurality of portions joined together to form a unitary valve needle disposed within the valve housing and extending through the actuator assembly, the unitary valve needle comprising:
   a shaft portion formed from a non-ferromagnetic material, the shaft portion extending through the magnetostrictive actuator assembly;
   a valve needle tip having sufficient durability to contact and seal the valve seat over multiple opening and closing cycles; and
   a member through which the valve opening force is transferred from the tubular actuator assembly to the unitary valve needle,
   wherein the unitary valve needle is movable between a closed position at which the valve needle tip contacts the valve seat to fluidly seal the interior chamber from the nozzle orifice, and an open position at which the valve needle tip is spaced apart from the valve seat whereby the interior chamber is fluidly connected with the nozzle orifice; and (d) a needle biasing mechanism associated with the valve needle, the needle biasing mechanism applying a closing force to the valve needle for biasing the valve needle in the closed position.

In a preferred injection valve, the actuator assembly and the magnetostrictive member are tubular. The valve needle tip is preferably formed from a material having through-hardness greater than that of the non-ferromagnetic material. The preferred needle biasing mechanism is a spring, most preferably at least one disc spring.

In the above-described arrangement, the actuator assembly is disposed in an annular space that surrounds a portion of the valve needle. This is a preferred arrangement because it allows for a compact design. The actuator assembly is typically elongated and has a length that is determined by the desired lift, which in turn determines the length of the magnetostrictive member. When a magnetostrictive actuator is actuated, a magnetic field is applied to the magnetostrictive member to cause it to expand in length. Longer magnetostrictive members are able to expand by greater amounts, resulting in greater lift when used in an injection valve application.

Conventional devices with similar arrangements (that is, a solid member extending through a tubular magnetostrictive member) employ a non-ferromagnetic member to avoid interfering with the magnetic field. In the field of magnetostrictive materials, it is generally believed that employing a ferromagnetic material for the valve needle will cause leakage of magnetic flux, which may in turn compromise performance since all flux is intended to pass through the tubular magnetostrictive member and the flux paths provided by conventional poles and flux tubes. Consistent with such beliefs, conventional devices with similar arrangements have employed non-ferromagnetic materials such as, for example, austenitic stainless steel, titanium and ceramics.

A disadvantage of using a non-ferromagnetic material for the present application, however, is that the valve tip is subjected to high frequency impact loads caused whenever the valve tip is seated against the valve seat. Compared to ferromagnetic materials, non-ferromagnetic materials such as titanium and austenitic stainless steel generally cannot be hardened to match the durability of ferromagnetic materials. Past approaches to solving some of these disadvantages have included coating the non-ferromagnetic material to improve its durability, but coatings are generally more suited to components that are subjected to sliding movements rather than impact loads.

The ferromagnetic material for the valve needle tip is preferably a suitable tool steel. For example, a tool steel such as H type or M type is a preferred material for the valve needle tip. Examples of a suitable non-ferromagnetic material for the shaft portion are members formed from titanium alloys, austenitic stainless steels and ceramics. Accordingly, the composite needle is preferably made from at least two pieces made from different materials that are joined together to provide a unitary composite needle. That is, the composite needle preferably comprises a non-ferromagnetic shaft piece and a ferromagnetic valve needle tip. Those skilled in the art will recognize that other embodiments are possible wherein the composite needle comprises three or more pieces joined together.

The injection valve preferably further comprises a hydraulic link assembly comprising a passive hydraulic link having a hydraulic fluid thickness through which the opening and closing forces are transmitted. The hydraulic fluid acts substantially as a solid with the thickness being substantially constant while the actuator assembly is actuated and wherein the thickness of the hydraulic link is adjustable while the actuator is not activated in response to changes in the dimensional relationship between components of the injection valve to maintain a desired valve lift upon actuation of the actuator assembly.

In a preferred embodiment, the thickness of the hydraulic link is auto-adjustable in response to changes in the dimensional relationship caused by differential thermal expansion, variations in manufactured dimensions within design tolerances, and/or wear to components of the injection valve. The hydraulic link assembly preferably comprises a fluidly sealed hydraulic cylinder, with a piston and hydraulic fluid disposed within the hydraulic cylinder. The piston may be an integral part of the composite valve needle. The piston may be formed from a different material than the valve shaft portion. For example, for durability, the piston is preferably formed from a material that is hardenable to a greater through-hardness than the shaft portion, which is made from a non-ferromagnetic material. For example, the piston may be made from a material such as stainless steel, but a harder material such as tool steel is preferred. Because there is a very small clearance gap between the piston and the hydraulic cylinder, it is also desirable for the piston to be made from a material that can be readily machined to high tolerances. For example, chromium-molybdenum steel alloys such as AISI 4140 specification steel are suitable materials for the piston.

The actuator assembly preferably comprises an electric coil disposed around the magnetostrictive member and a flux tube disposed around the electric coil. In preferred arrangements, the actuator assembly may be disposed within the interior chamber of the injection valve. One end of the tubular actuator assembly may be held in a fixed position in relation to the valve housing by a pole that supports the magnetostrictive member. The pole is attached to the valve housing to prevent movement of the supported end of the magnetostrictive member when the actuator assembly is actuated. In one embodiment, the flux tube and/or the pole associated with the valve housing are integral parts of the valve housing and/or the magnetostrictive member. In this embodiment the valve housing is formed from a magnetically permeable material, such as common carbon steel and the valve housing advantageously also acts as the flux tube, obviating the need for a separate component.

In a preferred embodiment, the injection valve comprises an inlet port and nozzle orifices arranged substantially at opposite ends of the injection valve. Fluid passages extend through or between the actuator and hydraulic link assemblies and the valve housing to allow fuel to flow from the inlet port to the nozzle orifices. The flow of fuel through such fluid passages cools the actuator and hydraulic link assemblies. Such fluid passages may be formed by longitudinally-oriented grooves in the surfaces of components of the actuator assembly and the hydraulic cylinder and/or longitudinally-oriented grooves in the inner wall of the-valve housing. Providing port openings through components of the actuator, the hydraulic link assemblies and the valve housing may also form such fluid passages.

The actuator assembly is controllable to control the desired lift between 10 and 100 percent of maximum lift. That is, the control pulse directed to the actuator assembly can be modulated to provide full or partial lift, as desired. The control pulse is a modulated electric current directed to an electric coil that produces a magnetic field.

The present injection valve is particularly suited for injecting a gaseous fuel because the ability to modulate the movement of the valve needle may be beneficially used to slow down the closing action of the valve needle to reduce impact upon closing. When a liquid fuel is injected, the closing impact is dampened by the displacement of the thin liquid fuel layer, which is considerably denser than gaseous fuels. When the fuel is a gaseous fuel, it can be injected into the combustion chamber at a pressure greater than about 2000 psi (about 13.8 MPa).

A magnetostrictive material that is suitable for use in the present injection valve comprises a material known as ETREMA Terfenol-D® magnetostrictive alloy that is available from Etrema Products Inc. ETREMA Terfenol-D® magnetostrictive alloy is a metal alloy composed of the elements terbium, dysprosium and iron.

In a preferred embodiment, the valve needle, actuated by a magnetostrictive assembly, is controllable to move between the closed and open positions in less than about 250 microseconds.

To improve the range of valve lift for an actuator comprising a magnetostrictive member with a given length, a compressive force may be applied to the magnetostrictive member. The net displacement may be increased per respective unit of applied magnetic field by pre-loading the magnetostrictive member. Accordingly, a compression spring member may be employed for applying a compressive force to pre-load the magnetostrictive member. In a preferred embodiment, the compression spring member comprises at least one disc spring (also known as a Belleville spring or Belleville washer).

The injection valve housing may comprise a plurality of parts that are joined with each other to provide a fluidly sealed body. For example, the valve housing may comprise a hollow main housing with a removable valve cap that allows access to the valve components disposed within the main housing. The valve housing may further comprise a separate valve tip so that it is replaceable when worn. In addition, the valve tip may be designed so that it is the only portion of the valve body that is directly exposed to the interior of the combustion chamber. In this case, the valve tip may be formed from a material that will provide greater durability when directly exposed to the conditions that might be expected within a combustion chamber.

While the hydraulic link is designed to compensate for changes in the dimensional relationships between valve components, including changes caused by differential thermal expansion, the demands placed upon the hydraulic link may be reduced by the selection of materials for the valve components that have similar thermal expansion coefficients.

A preferred fuel injection valve for an internal combustion engine comprises:

(a) a valve housing comprising:
   a fuel inlet port;
   an interior chamber fluidly connected to the fuel inlet port;
   a nozzle comprising a valve seat and a nozzle orifice providing a fluid passage from the interior chamber to the combustion chamber;

(b) an actuator assembly disposed within the valve housing, the actuator assembly comprising:
   a tubular magnetostrictive member actuatable to expand in the direction of an applied magnetic field to thereby apply an opening force that is stronger than a closing force;
   an electrical coil disposed around the magnetostrictive member;
   a flux tube disposed around the electrical coil; and
   a support for the actuator assembly that acts as a pole and provides a fixed position for one end of the magnetostrictive member relative to the valve housing;

(c) a plurality of portions joined together to form a unitary valve needle disposed within the valve housing, the unitary valve needle comprising:
   a shaft portion formed from a non-ferromagnetic material, the shaft portion extending through the tubular magnetostrictive actuator assembly;
   a valve needle tip formed from a material having a through-hardness greater than that of the non-ferromagnetic material for contacting the valve seat; and
   an integral piston member through which the valve opening force is transferred from the actuator assembly to the unitary valve needle;
   wherein the unitary valve needle is movable between a closed position at which the valve needle tip contacts the valve seat to fluidly seal the interior chamber from the nozzle orifice and an open position at which the valve needle tip is spaced apart from the valve seat whereby the interior chamber is fluidly connected with the nozzle orifice;

(d) a needle spring associated with the valve needle, wherein the needle spring is compressible to apply the closing force to the valve needle for biasing the valve needle in the closed position; and (e) a passive hydraulic link assembly comprising a sealed hydraulic cylinder disposed about the piston member, a hydraulic fluid disposed within the hydraulic cylinder, wherein the opening and closing forces applied to the valve needle are transmitted through a thickness of the hydraulic fluid whereby the hydraulic fluid acts as a hydraulic link and the thickness is automatically adjustable in response to changes in the dimensional relationship between components of the injection valve to maintain a desired valve lift when the actuator assembly is actuated.

A composite valve needle can have advantages over a single piece valve needle since a material can be selected for the valve tip that has improved durability characteristics, a material can be selected for the shaft piece that is non-ferromagnetic, and a material can be selected for an integral piston that is durable and easy to machine to high tolerances. In addition, since non-ferromagnetic materials like titanium are lighter than equivalent ferromagnetic materials like tool steel, the shaft piece material can also be selected to reduce the overall mass of the composite needle. These and other advantages are provided by a directly actuated injector as described below.

DETAILED DESCRIPTION OF PREFERRED EMBODIMENT(S)

Figure 1:
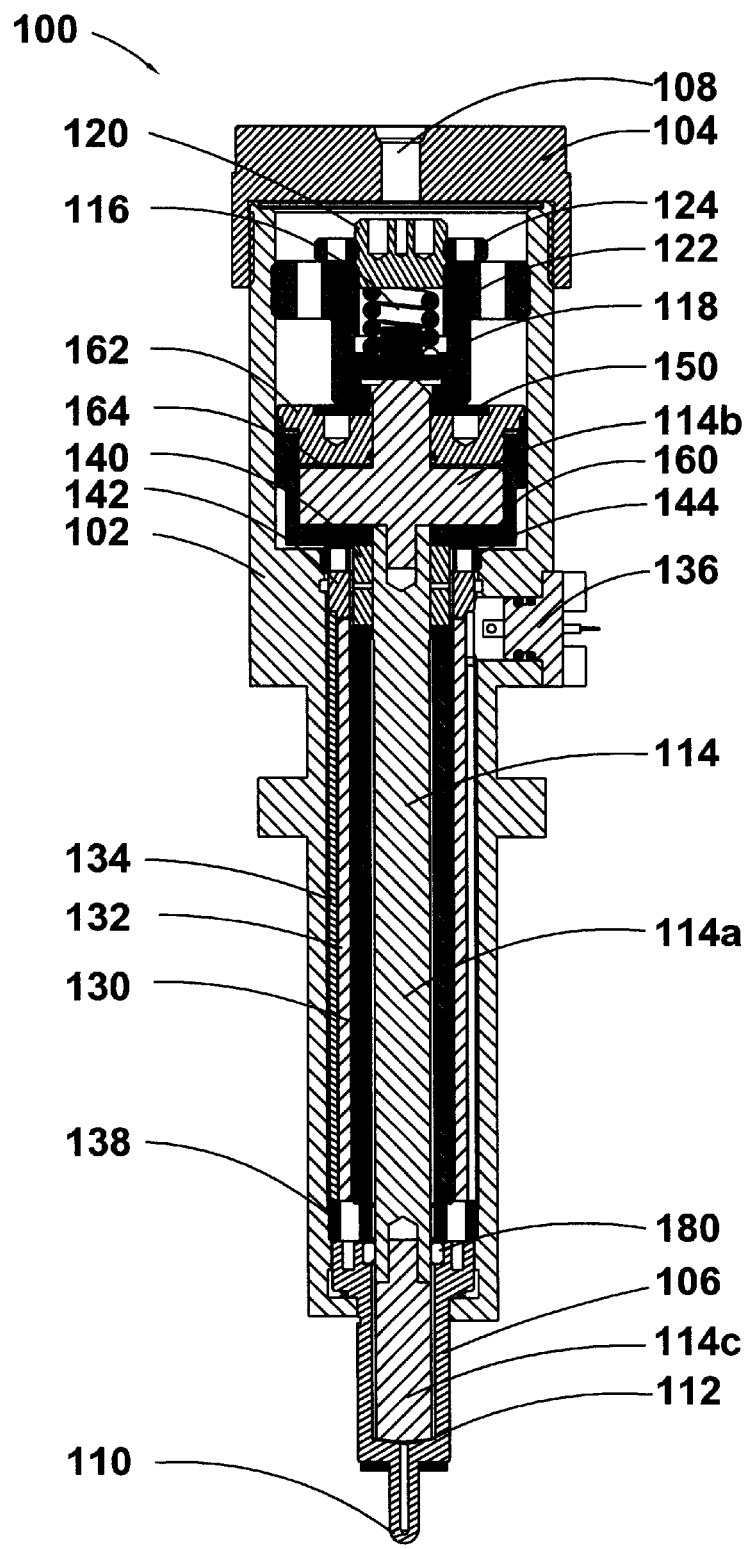
FIG. 1 is a cross-sectional view of a preferred embodiment of a directly actuated fuel injection valve.
Figure 2:
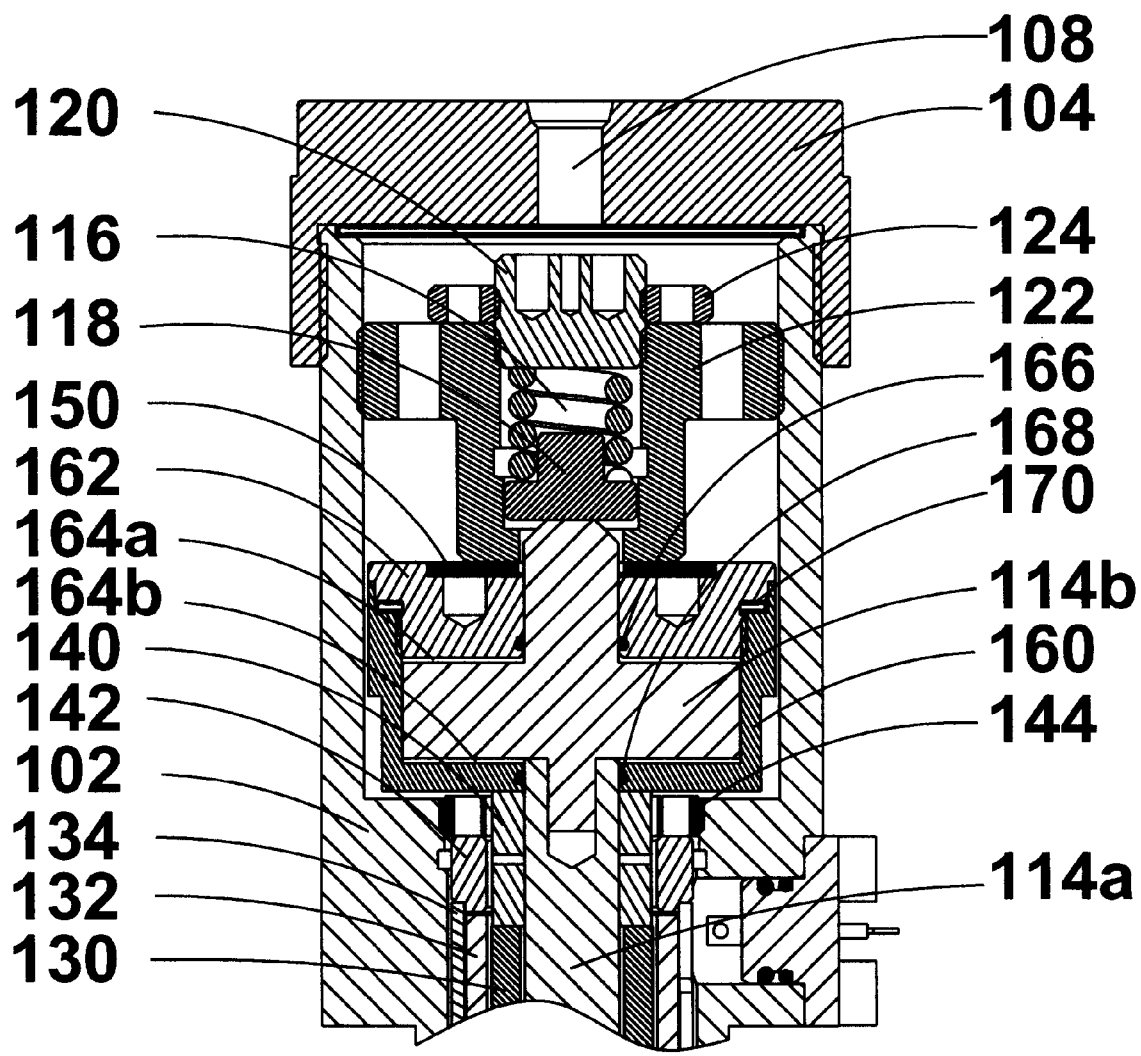
FIG. 2 is an enlarged cross-sectional view of an upper portion of the fuel injection valve of FIG. 1.
Figure 3:
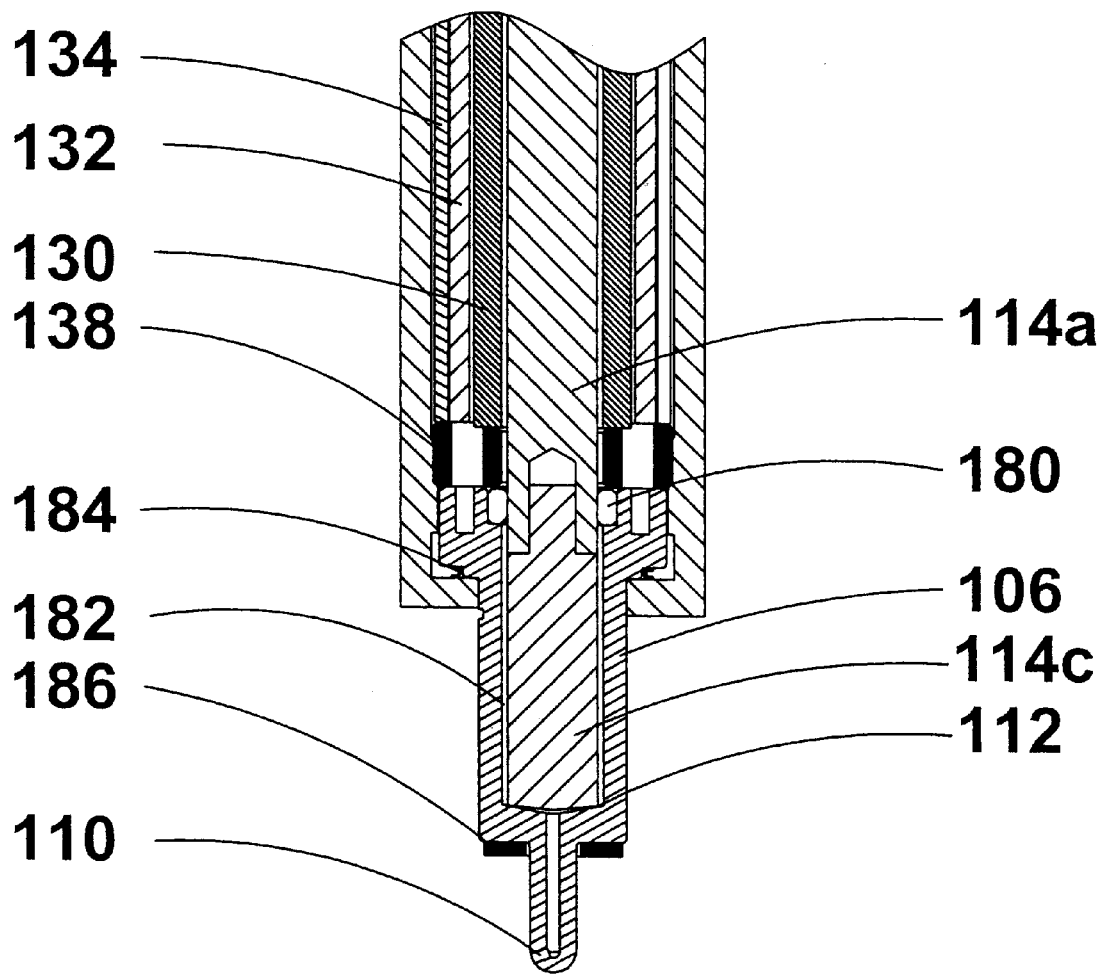
FIG. 3 is an enlarged cross-sectional view of a lower portion of the fuel injection valve of FIG. 1.

FIGS. 1–3 show a preferred embodiment of a directly actuated fuel injection valve 100 for internal combustion engines. Injection valve 100 includes elongated valve housing 102 that cooperates with valve cap 104 and valve tip 106 to provide a fluidly sealed valve body. Seals may be employed to ensure that the assembled valve body is fluid-tight. Valve cap 104 comprises inlet port 108 through which fuel enters the valve body, and valve tip 106 comprises at least one nozzle orifice 110 through which fuel exits the valve body. Valve tip 106 further comprises valve seat 112.

In the preferred embodiment, shown more clearly in the enlarged view of FIG. 3, valve seat 112 is angled to maximize fluid flow following the sealing area (where valve needle 114 contacts valve seat 112). The differential angle between the end surface of valve needle 14 and valve seat 112 is chosen so that the flow area does not decrease as gas moves inward toward the central throat of valve tip 106 that feeds nozzle orifice(s) 110.

Unitary valve needle 114 is disposed within the interior of valve housing 102 and contacts valve seat 112 to close injection valve 100 by preventing fuel from passing beyond valve seat 112 to nozzle orifice 110. In the embodiment of FIG. 1, unitary valve needle 114 comprises valve stem or shaft portion 114a, piston member 114b, and valve needle tip 114c.

Valve shaft portion 114a extends through the tubular actuator assembly, which comprises magnetostrictive member 130 and which will be described in more detail below. Valve shaft portion 114a is preferably formed from a non-ferromagnetic material to prevent it from providing a flux path for draining magnetic flux from magnetostrictive member 130. For example, valve shaft portion 114a can be formed from titanium alloys, austenitic stainless steels, or ceramics.

Valve needle tip 114c is driven against valve seat 112 every time injection valve 100 is closed. Accordingly, valve needle tip is preferably designed to withstand high frequency impact loads. In general, for materials of about the same cost, non-ferromagnetic materials cannot be formed with essentially the same through-hardness and durability as common ferromagnetic materials. For example, titanium alloy can be heat treated to a maximum Rockwell hardness scale C rating of 45 whereas valve seat 112, which is part of valve housing 102, can be formed from a tool steel which can be hardened to a Rockwell hardness scale C rating of 55, and with a nitriding process a Rockwell hardness scale C rating of 65 can be achieved. If the material for valve needle tip 114c is much softer than the material which forms valve seat 112, this results in faster wear to valve needle tip 114c and eventually to functional degradation at more frequent intervals. An advantage of using a composite, multi-piece or multi-portion valve needle, such as unitary valve needle 114, is that shaft portion 114a can be formed from a non-ferromagnetic material and valve needle tip 114c can be formed from a harder ferromagnetic material, such as tool steel. For example H type or M type tool steel are suitable materials for valve needle tip 114c.

In the illustrated embodiment of FIGS. 1 and 2, unitary valve needle 114 also comprises integral piston member 114b, which is formed from a separate portion joined to shaft portion 114a. Accordingly, piston member 114b may be formed from a different material than shaft portion 114a. For example, piston member 114b can be formed from the same material as valve needle tip 114c.

Unitary valve needle 114 moves into the open position by moving inward within the valve body to lift away from valve seat 112. Valve needle tip 114c is a cylindrical member and since the valve lift is generally small (for example, about 65 micrometers), the diameter of valve needle tip 114c is selected to ensure sufficient flow capacity through the valve opening since flow area (A) is proportional to valve needle tip diameter (that is, A=π×diameter×lift). Hence, a small lift can be compensated for by a larger diameter.

In the preferred embodiment illustrated by FIG. 1, valve needle 114 comprises an integral piston. However, in another embodiment (not shown) a separate piston member may cooperate with valve shaft portion 114a to provide the same effect.

Spring Assembly

A spring assembly biases valve needle 114 in the closed position. In a preferred arrangement, the spring assembly comprises at least one needle spring 116 for providing a closing force to valve needle 114. With reference to embodiment of FIG. 1, the spring assembly further comprises a needle spring guide 118 for transmitting the closing force from needle spring 116 to valve needle 114. Needle spring 116 is held in compression by needle spring adjuster 120, which cooperates with needle spring housing 122 to provide a load path to valve housing 102. In a preferred arrangement, respective threaded surfaces join needle spring adjuster 120 to needle spring housing 122, and needle housing 122 to valve housing 102. After needle spring adjuster 120 has been rotated to compress needle spring 116 to provide the desired pre-load force to needle spring 116, locking nut 124 may be tightened to prevent needle spring adjuster 120 from loosening. The spring energy set by compressing or pre-loading needle spring 116 provides the closing force for keeping valve needle 114 in the closed position.

Actuator Assembly

An actuator assembly may be actuated to provide an opening force that is opposite and greater than the closing force provided by the spring assembly. In the embodiment illustrated in FIG. 1, the actuator assembly comprises a magnetostrictive member that expands or contracts in the direction of the opening force when the member is exposed to a magnetic field.

In the embodiment illustrated by FIG. 1, the actuator assembly is a magnetostrictive actuator that comprises tubular magnetostrictive member 130, electric coil 132 disposed around the outer diameter of magnetostrictive member 130, a flux tube 134 disposed around electric coil 132. Flux tube 134 may be formed from any magnetically permeable material such as ferrite, stainless steel, or common carbon steel. A lengthwise slit may be provided opposite to where the magnetostrictive member is positionable in the assembled actuator assembly to break eddy currents. In another embodiment (not shown) the valve housing acts as the flux tube. That is, the flux tube is integral with valve housing 102, which may be formed from stainless steel or common carbon steel.

An electric current is supplied to electrical fitting 136. Electric leads (not shown) conduct the electric current from electrical fitting 136 to electric coil 132. When an electric current is applied to electric coil 132 a magnetic flux develops that flows through magnetostrictive member 130, pole 138, 140 and 142, and flux tube 134. Poles 138, 140 and 142 are formed from a suitable magnetically permeable material such as ferrite, stainless steel or common carbon steel. Pole 138 is a "fixed" pole that provides a structural support for a first end of magnetostrictive member 130, electric coil 132 and flux tube 134. Pole 140 is associated with a second end of magnetostrictive member 130 and pole 142 is associated with a second end of electric coil 132 and flux tube 134. Pole 140 is an "inner" pole and pole 142 is an "outer" pole disposed concentrically around inner pole 140. Pole 142, electric coil 132 and flux tube 134 are held in place by lock nut 144, which preferably threads into the inner wall of valve housing 102. Poles 140 and 142 cooperate with one another to provide a flux path at the second end of the actuator assembly, but pole 140 may move relative to pole 142 so that magnetostrictive member 130 may expand in the direction of the magnetic field which is oriented so that the actuator assembly provides an opening force in opposition to the closing force of the spring assembly.

In another embodiment (not shown), poles 138 and 142 are integral parts of valve housing 102 and pole 140 may be integral with magnetostrictive member 130. Poles 138 and 142 can be integrated with housing 102 when housing 102 is formed from a material which is magnetically permeable, such as stainless steel or common carbon steel.

A pre-compression force is preferably applied to magnetostrictive member 130 to amplify the magnitude of expansion when a magnetic field is applied. Pre-compression of magnetostrictive member 130 increases the net displacement per unit of applied magnetic field. A spring, such as, for example, disc spring 150 may be employed to provide the pre-compression force. Alternative compression elements may be employed in place of disc spring 150 to provide the pre-compression force, such as, for example, a coil spring or another type of spring with the same spring force, a hydraulic piston, or a combination of compression elements. When a pre-compression force is employed, the actuator's displacement can increase to about 0.13% of the total length of magnetostrictive member 130. However, the amount of displacement may decline as a function of increasing temperature. For example, at typical reciprocating engine cylinder head temperatures the actual displacement may be about 0.065% of the length of pre-compressed magnetostrictive member 130.

The dimensions of magnetostrictive member are dictated by the requirements of injection valve 100. For example, if injection valve 100 is designed to provide a lift of at least about 65 μm, magnetostrictive member 130 is sized to have a length of at least about 100 mm. Additionally, the wall thickness of annular magnetostrictive member 130 is selected to provide sufficient force to overcome all of the opposing forces that hold injection valve 100 in the closed position. If the cross-sectional area of annular magnetostrictive member 130 is not sufficient, the opposing forces can reduce or prevent longitudinal displacement of magnetostrictive member 130, even when electric coil 132 is fully energized. This mode is known as the "blocked force" mode. Accordingly, the magnitude of the closing forces acting on valve needle 114 dictate the cross sectional area of magnetostrictive member 130.

As shown in FIG. 1, the actuator assembly is preferably located within valve housing 102 and disposed concentrically around valve shaft portion 114*a* where it occupies a portion of the annular space between valve shaft portion 114*a* and valve housing 102. Accordingly, the actuator assembly may be exposed to fuel that is directed through the hollow valve body on its way from inlet port 108 to nozzle orifice 110.

Hydraulic Link Assembly

The opening force generated by the actuator assembly is transmitted to valve needle 114 through a hydraulic link assembly. The hydraulic link assembly comprises hydraulic cylinder 160, which is disposed in close-fitting relationship around hydraulic piston 114*b*, which is free to move in the longitudinal direction within cylinder 160. As mentioned above, in the embodiment of FIG. 1, in a preferred embodiment, hydraulic piston 114*b* is an integral part of valve needle 114 and the side wall of cylinder 160 helps to guide the movement of valve needle 114 in the actuating direction. A viscous hydraulic fluid is sealed inside hydraulic cylinder 160 by cylinder cap 162 and seals 166, 168 and 169 (see FIG. 2). Seals 166 and 168 permit valve needle 114 to move relative to cylinder cap 162 and cylinder 160, respectively. Known seals may be employed, such as, for example elastomeric O-ring seals, packing, metal seals, or diaphragm/bellow seals.

The diametrical clearance gap between the outside diameter of hydraulic piston 114*b* and the inside diameter of hydraulic cylinder 160 is extremely small (on the order of 20 to 250 microns). The desired size of the clearance gap is dependent on several factors such as the viscosity of the chosen hydraulic fluid, the axial length of the piston, and the thickness of the hydraulic fluid above and below the piston. The hydraulic flow in the clearance gap is governed by the Hagen-Poiseuille Flow and the hydraulic fluid and clearance gap are preferably selected so that the flow of hydraulic fluid through the gap is insignificant during the time span of fuel injection events when an opening force is transmitted through the hydraulic fluid. Furthermore, the hydraulic fluid preferably has a sufficiently high viscosity and bulk modulus so that it acts as an incompressible solid when actuation of the actuator assembly causes a valve opening force to be quickly transmitted through the hydraulic fluid between the bottom of cylinder 160 and hydraulic piston 114*b*. For consistency of operation, the hydraulic fluid is also preferably an extremely stable fluid that maintains its desired properties over a wide range of temperatures (that is, within the expected operating temperatures inside cylinder 160). Suitable hydraulic fluids are, for example, conventional motor oil, such as grade 15W40, or synthetic lubricants such as DuPont® Krytox® grease which is available in a range of viscosities. Krytox® is a perfluoropolyether (PFPE) synthetic lubricant that may be mixed with a thickener to form a grease. These types of hydraulic fluids also help to lubricate seals 166 and 168. Different injection valves may have different sized pistons and clearance gaps, so the hydraulic fluid may be selected with consideration to the characteristics of an individual injection valve design.

When injection valve 100 is closed and at rest, the closing force is transmitted through the hydraulic fluid held between cylinder cap 162 and hydraulic piston 114*b*. Typically, during engine operation, injection valve 100 is closed most of the time (normally over 90% of the time). Accordingly, there is enough time between injection events for the hydraulic fluid to redistribute itself by flowing through the clearance gap so that hydraulic cylinder 160 moves relative to piston 114*b* to automatically "re-zero" itself. The initial zero-position is the position of hydraulic piston 114*b* within hydraulic cylinder 160 after assembly of injection valve 100. The initial zero position may not be the same for all injectors due to variation in the length of components within manufacturing tolerances. Also, during operation, the zero-position auto-adjusts to change depending, for example, upon component wear or upon the effects of thermal expansion on the dimensional relationship between components.

Differential thermal expansion or contraction may be caused by differences in thermal expansion coefficients or uneven heat distribution between the components. Even though the components of injection valve 100, such as magnetostrictive member 130, valve needle 114, and valve housing 102, are designed to be reasonably matched to the thermal expansion rates of the other components, because the valve lift and the displacement of the components that causes the lift are so small, the effects of thermal expansion or contraction should be taken into account to ensure the desired valve lift is achieved. The effects of thermal expansion and contraction may be amplified if the injection valve is exposed to a wide range of temperatures. For injection valves used in vehicles it would not be uncommon to expect a temperature range between −40° C. (in cold climates) and +125° C. (when the engine is running). An uneven temperature distribution may be the result of many factors, including, for example, the influence of (1) heat generated at coils 132; (2) magnetic hysteresis in the actuator assembly; and (3) heat transfer from the cylinder head or the combustion chamber via valve tip 106. If unaccounted for, the total effect of differential thermal expansion or contraction on the displacement of valve needle 114 may be greater than the targeted lift.

In summary, the hydraulic link assembly accounts for variations in component dimensions arising from the permitted tolerances in the manufacturing processes and the injection valve assembly methods. Therefore, the hydraulic link assembly reduces manufacturing costs by allowing the injection valve components to be manufactured to less exacting tolerances. In addition, during operation, the hydraulic link assembly auto-adjusts itself between injection events to account for changes in the dimensional relationship between injection valve components that may be caused, for example, by component wear or differential thermal expansion or contraction.

Summary of Operation

When injection valve 100 is at rest in the closed position, the closing force that biases valve needle 114 against valve seat 112 originates from needle spring 116. From needle spring 116, the closing force is transmitted through needle spring guide 118 to valve needle 114. It is preferable for the closing force to be provided by a mechanical spring member, such as the illustrated coil spring, so that the failure mode for injection valve 100 will be in the closed position. That is, if the actuating assembly is not energized or fails, injection valve 100 will remain in the closed position.

To initiate an injection event the actuator assembly is energized by directing an electric current to electric coil 132. A magnetic flux develops that flows through magnetostrictive member 130, poles 138, 140, and 142, and flux tube 134. Under the influence of the magnetic field, magnetostrictive member 130 expands in length (in the direction of the magnetic field). Since pole 138 is in a fixed position, magnetostrictive member 130 expands in the direction of hydraulic cylinder 160. An opening force, originating from expanding magnetostrictive member 130 is transmitted through inner pole 140, the base of cylinder 160, hydraulic fluid 164b (see FIG. 2), which is held between the base of cylinder 160 and a planar surface of hydraulic piston 114b, and finally, through piston 114b, which in the illustrated embodiment is integral with valve needle 114. The opening force is greater than the closing force, which results in compression of needle spring 116. The displacement of hydraulic cylinder 160 also causes further compression of disc spring 150.

As previously discussed, because valve actuation occurs suddenly (on the order of 200 µs), hydraulic fluid 164b does not have time to flow through the narrow clearance gap between piston 114b and hydraulic cylinder 160. Instead, hydraulic fluid 164b acts as a solid and transfers the movement of magnetostrictive member 130 to valve needle 114 via piston 114b, causing valve needle 114 to lift away from valve seat 112. Because injection valve 100 stays open for such a brief period (typically less than 3 milliseconds), as long as the viscosity of hydraulic fluid 164 is properly selected and the clearance gap is suitably sized, the flow of hydraulic fluid 164 through the clearance gap while injection valve 100 is open is insignificant so that any displacement caused by such flow is much less than the total displacement of valve needle 114.

The movement of valve needle 114 is guided near valve tip 106 by guide 180 (see FIG. 3). FIG. 3 shows annular space 182 disposed around valve needle tip 114c. Between injection events, fuel remains in annular space 182. When injection valve 100 is open, fuel flows through annular space 182, other gaps between valve components, and openings provided in certain valve components, which all cooperate to permit the free flow of fuel from inlet port 108 through to nozzle orifice 110 (which may be one of a plurality of nozzle orifices radially-oriented from the nozzle throat). For example, FIGS. 1–3 show openings that provide fluid passages through components such as needle spring housing 122, lock nut 144, and pole 138. FIG. 3 also shows seal 184 between valve housing 102 and valve tip 106, and cylinder head face seal 186, which seals between injection valve 100 and the engine cylinder head (not shown).

As fuel flows through valve housing 102, the fuel cools the actuator assembly. The fuel flow path is preferably arranged to provide the greatest cooling to the internal diameter surface of electric coil 132 and the outer diameter surface of magnetostrictive member 130. In addition, a small percentage of the fuel flow, perhaps up to about 20%, may be directed to flow between the internal diameter of magnetostrictive member 130 and the surface of cylindrical valve shaft portion 114a. When the fuel is used to cool the actuator assembly in this manner, thermal modeling predicts a temperature rise of less than 10° C.

To close injection valve 100, at the end of the injection event, electric coil 132 is de-energized, causing magnetostrictive member 130 to contract. When valve needle 114 is moving from the open position to the closed position, the closing force originates from needle spring 116 and disc spring 150. The closing force from needle spring 116 is again transmitted to valve needle 114 through needle spring guide 118. In the open position, the expanded magnetostrictive member 130 compressed disc spring 150, so upon closing, disc spring 150 de-compresses to push cylinder 160 down and to compress to magnetostrictive member 130. Disc spring 150 may also provide an additional closing force to valve needle 114 by generating a closing force that is transmitted from disc spring 150 through cylinder cap 162, hydraulic fluid 164a and hydraulic piston 114b.

When valve needle 114 moves from the open position to the closed position, the time that elapses is again typically less than 250 microseconds, and preferably less than about 200 microseconds so hydraulic fluid 164 again does not have time to flow through the clearance gap between piston 114b and cylinder 160. Consequently, pressure builds up in hydraulic fluid 164a on the upper planar surface of piston 114b.

Once valve needle 114 contacts valve seat 112, injection valve 100 is closed. When injection valve 100 is closed, the hydraulic link assembly automatically self-adjusts so that the position of hydraulic cylinder 160 relative to hydraulic piston 114b is corrected to account for the effects of temperature, wear, and any small movements of valve needle 114 relative to hydraulic cylinder 160 that may have occurred while valve needle 114 was in the open position. Auto-adjustments are accomplished by the migration of hydraulic fluid 164 from one side of hydraulic piston 114b to the other, while disc spring 150 ensures that hydraulic cylinder 160 and valve needle 114 remain in direct contact at all times.

The present injection valve provides several benefits, including:

a compact concentric valve needle/actuator assembly arrangement for accommodating an elongated tubular magnetostrictive member.

improved durability by employing a valve needle tip formed from a ferromagnetic material instead of a non-ferromagnetic material. Known devices which employed members disposed within a tubular magnetostrictive member have used members formed from non-ferromagnetic materials to avoid leakage of magnetic flux. However, non-ferromagnetic materials such as austenitic stainless steels, titanium, and ceramics cannot match the through-hardness properties and durability of ferromagnetic materials, which is a property desirable for members subjected to impact loads.

improved manufacturability is made possible by the use of axisymmetric cylindrical parts and few tight tolerances between the injection valve components.

While particular elements, embodiments and applications of the present invention have been shown and described, it will be understood, of course, that the invention is not limited thereto since modifications may be made by those skilled in the art without departing from the scope of the present disclosure, particularly in light of the foregoing teachings.

What is claimed is:

1. An injection valve for injecting fuel into a combustion chamber of an internal combustion engine, said injection valve comprising:
    (a) a valve housing comprising:
       a fuel inlet port;
       an interior chamber fluidly connected to said fuel inlet port;
       a nozzle comprising a valve seat and at least one nozzle orifice providing a fluid passage from said interior chamber to said combustion chamber;
    (b) an actuator assembly disposed within said valve housing, said actuator assembly comprising a magnetostrictive member actuatable by imposition of a magnetic field to expand in length to provide a valve opening force;
    (c) a plurality of portions joined together to form a unitary valve needle disposed within said valve housing and extending through said actuator assembly, said unitary valve needle comprising:
       a shaft portion formed from a non-ferromagnetic material, said shaft portion extending through said magnetostrictive actuator assembly;
       a valve needle tip having sufficient durability to contact and seal said valve seat over multiple opening and closing cycles; and
       a member through which said valve opening force is transferred from said tubular actuator assembly to said unitary valve needle,
       wherein said unitary valve needle is movable between a closed position at which said valve needle tip contacts said valve seat to fluidly seal said interior chamber from said nozzle orifice, and an open position at which said valve needle tip is spaced apart from said valve seat whereby said interior chamber is fluidly connected with said nozzle orifice; and
    (d) a needle biasing mechanism associated with said valve needle, said needle biasing mechanism applying a closing force to said valve needle for biasing said valve needle in said closed position.

2. The injection valve of claim 1 wherein said actuator assembly and said magnetostrictive member are tubular.

3. The injection valve of claim 1 wherein valve needle tip is formed from a material having through-hardness greater than that of said non-ferromagnetic material.

4. The injection valve of claim 1 wherein said needle biasing mechanism is a spring.

5. The injection valve of claim 4 wherein said spring comprises at least one disc spring.

6. The injection valve of claim 1 further comprising a hydraulic link assembly comprising a passive hydraulic link having a hydraulic fluid thickness through which said opening and closing forces are transmitted, whereby said hydraulic fluid acts substantially as a solid with said thickness being substantially constant while said actuator assembly is actuated and wherein said thickness of said hydraulic link is adjustable while said actuator is not actuated in response to changes in the dimensional relationship between components of said injection valve to maintain a desired valve lift upon actuation of said actuator assembly.

7. The injection valve of claim 1 wherein said valve needle tip is formed from tool steel.

8. The injection valve of claim 7 wherein said tool steel is selected from the group consisting of H type and M type tool steels.

9. The injection valve of claim 1 wherein said shaft portion is formed from one of titanium, austenitic stainless steel and ceramic.

10. The injection valve of claim 6 wherein said thickness of said hydraulic link is auto-adjustable in response to changes in said dimensional relationship caused by at least one of differential thermal expansion, variations in manufactured dimensions within prescribed tolerances and component wear.

11. The injection valve of claim 6 wherein said passive hydraulic link assembly comprises a piston disposed within a fluidly sealed cylinder with a gap between said piston and interior walls of said cylinder, wherein said gap is sized to substantially prevent movement of hydraulic fluid from one side to the other side of said piston during an injection event.

12. The injection valve of claim 11 wherein said piston is said member that is an integral part of said unitary valve needle.

13. The injection valve of claim 12 wherein said piston is formed from a material having a greater through-hardness than said shaft portion.

14. The injection valve of claim 13 wherein said piston is formed from one of tool steel and stainless steel.

15. The injection valve of claim 1 wherein said actuator assembly further comprises an electric coil disposed around said magnetostrictive member and a flux tube disposed around said electric coil.

16. The injection valve of claim 15 wherein one end of said tubular actuator assembly is supported by a pole attached to said valve housing.

17. The injection valve of claim 15 wherein said housing is formed from a magnetically permeable material and said flux tube is an integral part of said valve housing.

18. The injection valve of claim 6 wherein fluid passages extend through or between said actuator and hydraulic link assemblies and said valve housing to allow said fuel to flow to said nozzle orifices and cool said actuator and hydraulic link assemblies.

19. The injection valve of claim 18 wherein said fluid passages are formed by grooves in the longitudinal surfaces of components of said actuator assembly and said hydraulic cylinder.

20. The injection valve of claim 18 wherein said fluid passages are formed by longitudinal grooves in the inner wall of said valve housing.

21. The injection valve of claim 18 wherein said fluid passages are formed by port openings through components of said actuator and hydraulic link assemblies and said valve housing.

22. The injection valve of claim 1 wherein valve lift is controllable by varying the magnitude of an electric current directed an electric coil to apply a magnetic field to said magnetostrictive actuator assembly.

23. The injection valve of claim 1 wherein said magnetostrictive member comprises a metal alloy comprising terbium, dysprosium and iron.

24. The injection valve of claim 1 wherein said fuel is a gaseous fuel.

25. The injection valve of claim 24 wherein said hydraulic fluid is a liquid.

26. The injection valve of claim 25 wherein said hydraulic fluid is selected from the group consisting of motor oil and grease.

27. An injection valve for injecting fuel into a combustion chamber of an internal combustion engine, said injection valve comprising:
   (a) a valve housing comprising:
      a fuel inlet port;
      an interior chamber fluidly connected to said fuel inlet port;
      a nozzle comprising a valve seat and a nozzle orifice providing a fluid passage from said interior chamber to said combustion chamber;
   (b) an actuator assembly disposed within said valve housing, said actuator assembly comprising:
      a tubular magnetostrictive member actuatable to expand in the direction of an applied magnetic field to thereby apply an opening force that is stronger than a closing force;
      an electrical coil disposed around said magnetostrictive member;
      a flux tube disposed around said electrical coil; and
      a support for said actuator assembly that acts as a pole and provides a fixed position for one end of said magnetostrictive member relative to said valve housing;
   (c) a plurality of portions joined together to form a unitary valve needle disposed within said valve housing, said unitary valve needle comprising:
      a shaft portion formed from a non-ferromagnetic material, said shaft portion extending through said tubular magnetostrictive actuator assembly;
      a valve needle tip formed from a material having a through-hardness greater than that of said non-ferromagnetic material for contacting said valve seat; and
      an integral piston member through which said valve opening force is transferred from said actuator assembly to said unitary valve needle;
      wherein said unitary valve needle is movable between a closed position at which said valve needle tip contacts said valve seat to fluidly seal said interior chamber from said nozzle orifice and an open position at which said valve needle tip is spaced apart from said valve seat whereby said interior chamber is fluidly connected with said nozzle orifice;
   (d) a needle spring associated with said valve needle, wherein said needle spring is compressible to apply said closing force to said valve needle for biasing said valve needle in said closed position; and
   (e) a passive hydraulic link assembly comprising a sealed hydraulic cylinder disposed about said piston member, a hydraulic fluid disposed within said hydraulic cylinder, wherein said opening and closing forces applied to said valve needle are transmitted through a thickness of said hydraulic fluid whereby said hydraulic fluid acts as a hydraulic link and said thickness is automatically adjustable in response to changes in the dimensional relationship between components of said injection valve to maintain a desired valve lift when said actuator assembly is actuated.

28. The injection valve of claim 27 wherein said magnetostrictive member comprises a metal alloy comprising terbium, dysprosium and iron.

* * * * *